(12) United States Patent
Buldas et al.

(10) Patent No.: US 12,112,324 B2
(45) Date of Patent: Oct. 8, 2024

(54) VERIFIABLY UNIQUE TRANSFER OF EXCLUSIVE CONTROL OF DATA UNITS

(71) Applicant: Guardtime SA, Lausanne (CH)

(72) Inventors: Ahto Buldas, Tallinn (EE); Mart Saarepera, Tallinn (EE); Michael Gault, Rovaniemi (FI)

( * ) Notice: Subject to any disclaimer, the term of this patent is extended or adjusted under 35 U.S.C. 154(b) by 380 days.

(21) Appl. No.: 17/194,303

(22) Filed: Mar. 7, 2021

(65) Prior Publication Data

US 2021/0279727 A1    Sep. 9, 2021

Related U.S. Application Data

(60) Provisional application No. 62/986,530, filed on Mar. 6, 2020.

(51) Int. Cl.
| | |
|---|---|
| *G06Q 20/40* | (2012.01) |
| *G06Q 20/38* | (2012.01) |
| *H04L 9/32* | (2006.01) |

(52) U.S. Cl.
CPC ....... *G06Q 20/401* (2013.01); *G06Q 20/3825* (2013.01); *H04L 9/3236* (2013.01); *G06Q 2220/00* (2013.01)

(58) Field of Classification Search
CPC ............. G06Q 20/401; G06Q 20/3825; G06Q 2220/00; H04L 9/3236; H04L 9/3247
USPC .......................................................... 705/75
See application file for complete search history.

(56) References Cited

U.S. PATENT DOCUMENTS

| | | | |
|---|---|---|---|
| 10,262,321 B1* | 4/2019 | Ramanathan ...... | G06Q 20/3829 |
| 11,526,875 B1* | 12/2022 | Shetti ................ | G06Q 20/3678 |
| 2018/0330342 A1* | 11/2018 | Prakash ............. | G06Q 20/10 |
| 2019/0020729 A1* | 1/2019 | Chen .................. | G06Q 20/02 |
| 2019/0220621 A1* | 7/2019 | Chan .................. | G06Q 40/00 |
| 2019/0347657 A1* | 11/2019 | Guo ................... | G06Q 20/10 |
| 2020/0151682 A1* | 5/2020 | Hurry ................ | H04L 9/3239 |
| 2020/0294009 A1* | 9/2020 | Qing .................. | H04L 9/3239 |
| 2020/0327545 A1* | 10/2020 | Xie .................... | G06F 9/52 |
| 2021/0026745 A1* | 1/2021 | Wang ................. | G06F 11/183 |
| 2021/0174343 A1* | 6/2021 | Aggarwal .......... | G06Q 20/0655 |
| 2021/0256487 A1* | 8/2021 | Johnson ............. | G06Q 30/0601 |
| 2021/0273807 A1* | 9/2021 | Wertheim ........... | G06F 9/466 |
| 2022/0191037 A1* | 6/2022 | Hassanzadeh Nazarabadi ............ G06Q 20/065 | |
| 2023/0050160 A1* | 2/2023 | Chew ................. | G06F 16/25 |
| 2023/0098747 A1* | 3/2023 | Vijayaraghavan .................. G06Q 20/3827 705/69 |  |

* cited by examiner

*Primary Examiner* — Courtney P Jones
(74) *Attorney, Agent, or Firm* — Jeffrey Pearce

(57) ABSTRACT

Exclusive ownership of data units, such as monetary units, is transferred by inputting a request from a transferor, to transfer to a transferee at least a designated one of the data units, said request including an identifier of the transferor, an identifier of the designated data unit, and an identifier of a transferee. The identifier of the transferor is verified and the absence of any other request to transfer the designated data unit during an update period is confirmed. A designation of ownership of the designated data unit is then changed from the transferor to the transferee in a ledger, which is comprised of a group of subledgers, each configured as a blockchain. Ownership is thereby processed per-unit instead of per-account.

16 Claims, 12 Drawing Sheets

VERIFIABLY UNIQUE TRANSFER OF EXCLUSIVE CONTROL OF DATA UNITS

CROSS REFERENCE TO RELATED APPLICATIONS

This application claims priority of U.S. Provisional Patent Application No. 62/986,530, filed 6 Mar. 2020.

TECHNICAL FIELD

This invention relates to data security.

BACKGROUND

Data is everywhere nowadays, and few people in industrialized countries are not involved in some form of data transfer almost every day. Email, online purchases, bank transfers, online entertainment and news, requests for all manner of services, text messaging and even voice calls over digital networks, etc., are just a few of the seemingly countless instances of data transfer. In many cases, transfer involves some form of reproduction: Text written using one computing device (computer, smart phone, etc.) is passed in digitized form to another computing device for reproduction as an email or text message; data defining a copy of a document, or an address or reference such as a link to a web site, database entry, account, etc., is passed from one person to another; security keys are exchanged; etc. In these situations, more than one instance of some data set may, or even should, exist in more than one location at the same time, or, logically identically, more than one entity may have the ability to pass on to others the ability to hold, access, or otherwise control the data set.

In some other situations, however, only one entity at a time should be able to control further transfer of any instance of or reference to, or control over a data set. Examples of such "single valid instance" data sets include some permissions, highly secret documents, digital cash, etc.

One obvious problem when it comes to these situations is that there must exist some way to prove that an instance of digital information is indeed the only valid one, since, unlike physical objects, data is easy to perfectly copy. This applies as well to data sets that define permissions related to objects or digital information. One way to do this is to create a ledger that keeps track of the current authorized "owner" of the single-instance data set. This then moves the "problem" to being able to prove that the ledger itself is correct and has not been tampered with.

One form of ledger that has been proposed to solve this problem is a "blockchain", which, in its simplest form, is sequence of data "blocks" such that each block is cryptographically linked to at least one previous block so as to make any change to previously entered blocks detectable. In some cases, the blockchain forms a ledger that is distributed among several parties. Perhaps the most well-known example of the use of such a distributed ledger arrangement is Bitcoin.

One drawback of existing blockchain-backed ledger systems is lack of scalability. Distributed ledger technologies (DLT) such as Bitcoin by their nature require an entire blockchain to be held and managed by several disparate systems, which must then coordinate using some kind of consensus mechanism so that they all can agree on what the correct current state of the blockchain is. Moreover, permissionless DLT systems require some way to determine which entity is allowed to add to the blockchain. This leads to mechanisms such as proof-of-work or proof-of-stake, which introduce delay in addition to complexity. The Bitcoin system, for example, is designed not to update more frequently than about every ten minutes. Such a delay is unacceptable for many use cases where a potentially large number of data transfers need to be secured quickly. This drawback exists to varying degrees in most other blockchain solutions as well, such as Ethereum. Yet another drawback of such "cryptocurrency" arrangements is that the supply of their units of value is either a matter of probabilistic effort often by anonymous "miners" or the like, or is limited, or is in any event not under the control of any known entity that can control emission according to a deliberate policy.

The problem of lack of scalability arises in almost every system that relies on a global ledger that tracks the status of every transferrable data set in the system. In systems that involve a large number of transactions per time unit, bandwidth alone and network latency may be limiting factors. One way to reduce the bandwidth demand on a single ledger host, and to increase guaranteed accessibility, is to distribute the ledger. This then causes a need to ensure that all copies of the ledger are synchronized and correct.

Bitcoin introduced a new monetary unit—Unspent Transaction Outputs (UTXOs)—now used by many cryptocurrencies. UTXOs can only be spent once, but in doing so, new UTXOs are created and can have different values and owners. In a Bitcoin transaction, one or more UTXOs having a certain total value are destroyed (spent), and new UTXOs with potentially different values and owners are created.

In the context of electronic financial transactions, a commonly used arrangement is for users to have accounts, in which transactions involve changes of balances. Such account-based transaction systems also suffer from a lack of scalability since almost every transaction must be processed through at least one centralized or even multi-party clearance system. Yet another drawback of account-based systems arises when a central authority such as a country's central bank wishes to emit new currency units. If the currency units are intended to be individualized, such as through serial numbers, then this individualization is usually lost when account balances are changed, since accounts generally are defined by single-value balances.

DESCRIPTION

Figure 1:
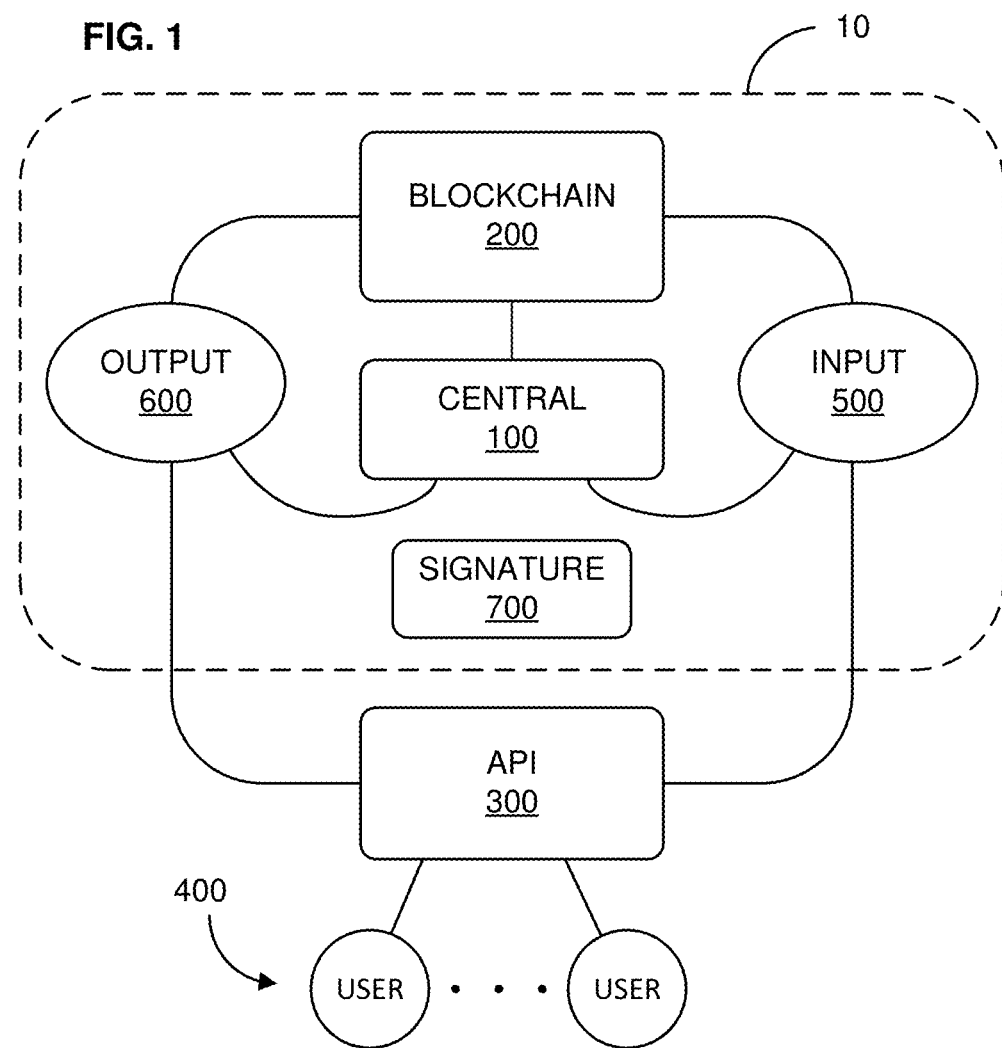
FIG. 1 depicts the main functional components of embodiments of the invention.

Embodiments disclosed here may be used to ensure verifiable transfer of ownership of any type of data unit, such that, logically, only one valid, transferrable instance of the data unit should exist at any one time. Here, a transferrable set of data may be viewed as a data "unit", even if it comprises more than one parameter, in that it is some body of information in digital form that is to be associated with only one entity at a time. Some examples of such data units are given above; others include digital titles to land or other property; digital versions of negotiable bearer instruments; access codes; etc.

Ownership of a data unit may be logical, that it, without a requirement for any data file or the like to be moved from the system of a current owner to the system of a subsequent owner. Consequently, reference here to transferring a data unit, such as a bill, is to be interpreted not as a requirement to move a data set from one system to another (although this would be possible, for example, in conjunction with a verified change of ownership of the data set), but rather that ownership of the respective data unit is changed from a transferor to a transferee. This is common even in other contexts as well. For example, some exclusive ownership rights may be changed in some jurisdictions simply by having the current owner, or its properly authorized representative, after proper verification of identity, upload to a governmental authority a proper request to record the change. Some mechanism is then usually provided to allow the new owner to verify the transfer went through. The concept of "bill" should therefore be considered as also comprising some digital information or data structure state that identifies the entity that has the exclusive ability to request a change of control of ownership of the right represented by the bill. In the case of money, that "right" is the ability to control ownership of a concept of value that has been established by the emitting entity and is accepted by a transferee.

Merely by way of example, and because the terminology for cash transfers is generally well-understood, embodiments are described below in the context of digital cash. This example also has the advantage of including some concepts such as "denomination" or "value" that may not be present in other contexts. This is, however, just one possible use case and the concepts may be applied in other cases as well with modifications—if needed at all—that skilled programmers will be able to implement.

Assume, again by way of example only, that the type of data unit one wishes to be able to transfer defines a unit of digital currency—a "digital bill", or simply "bill". Such a digital bill is a data structure that has at least the attributes of 1) nominal value and 2) a unique identifier such as a serial number.

As used here, the term "emitted money" is a number e that represents the total amount of money in current circulation, that is, the sum of the nominal values of all bills. Bills are "emitted" by an "emission process". In the physical world, bills (or other documents) are typically "emitted" by a central authority such as a country's central bank by being printed or minted, preferably in some difficult-to-counterfeit way, and then put into circulation through some predefined process. Below is described a method to emit digital bills.

After emission, some entity will be the authorized holder of a digital bill, that is, the "owner". Ownership of a digital bill is a digital data structure with at least the attributes: 1) an identifier $ID_U$ of the data unit, that is, the digital bill itself, and 2) an identifier IDOR of the transferor, that is, current owner. As for owner identity, note that embodiments of this invention make it possible, although not necessary, to maintain the anonymity of actual parties to transactions even during the transfer process. This is consistent with the concept of "cash": If Alice gives a $10 or €10 note to Bob, no other person or authority will typically know either's identity.

It is not required by any embodiment of this invention for an owner to be an individual human; rather, any identifiable entity may be an owner, etc., including individuals and groups, both physical and legal persons, and even software processes that are able to perform the actions described below to either initiate a transfer, receive ownership of a transferred data set, or both.

It is assumed that bills are to be transferred from one owner to another. In the context of the example of digital cash, this transfer may be a payment for something, a transfer for the purpose of deposit in some other data structure, etc. Note that, even if digital bills are held in accounts, that is, data structures that record the bills currently held by an owner, the system is not structured as a typical account, since the units of money described here as "bills" are individually identifiable and not simply treated as indistinguishable increases of a single-value "balance". In general, all transfers of digital cash are a form of "payment", which means simply the process of changing the owner of a digital bill. Payment is initiated by a payment order, which is represented by a digital data structure with at least the following attributes: 1) the digital bill to be transferred, 2) an identifier of the payer, who is the current owner; and 3) an identifier $ID_{EE}$ of the payee, that is, the recipient, who is to be made the new owner.

When designing a solution for transferring a data set, that is, a digital asset such as, for example, digital cash, some key considerations are:

What entity declares what a bill is?

What entity creates bills and makes them available ("emits")?

What entity declares who owns a bill?

What entity changes the owner, that is, who processes the payments?

The answers to these questions contain the following security concerns:

What secures a bill, and how? What makes it falsification-proof?

How is the emission process controlled and secured?

What secures the ownership, and how?

What guarantees and secures the payments, and how?

In the case of physical cash, for example, money is defined by a central bank and is provided with physical security elements that enable high security. The central bank controls the emission process, so it may be made highly secure. The owner is simply declared to be the physical owner and the owner is changed directly by the payer and payee: If Alice hands a paper €20 note to Bob, the transfer of ownership is complete and Bob is the new owner.

By way of comparison, and to better understand the improvements made by this invention, it is helpful here to illustrate some aspects and shortcomings (in particular, technical bottlenecks and lack of scalability) of existing methods for ensuring verifiable and unique transfer. Consider some existing models of digital money: bank money in two different settings, and Bitcoin. These models are 1) a trusted server solution that assumes a trusted processor that has full control over the data it cannot be audited/verified by external parties, 2) a modified solution in which data structures are augmented with cryptographic certificates that make the system externally auditable/verifiable, and 3) the Bitcoin system, which is similar to the second case, except that the emitting party is eliminated and replaced by a fixed emission rule, and the notion of ownership is slightly different.

In a trusted server solution, a bill is an entry in a database; bills are emitted by a bank, which defines the owner; the owner is the account holder, authenticated by the bank; and the owner is changed by the bank based on payment orders of account owners. The "bill" is in this trusted server case is a number in a bank account and may have any nominal value between 0 to e and the number of bills equals the number of accounts. Payment processing in this solution means that the bills of payer and payee are destroyed and new bills are emitted. The security of a bill and its ownership are based on full trust in the server, although the security of payment can be improved by server authentication, account holder authentication, and digitally signed payment orders.

One way to improve security is by replacing the trusted server with a certified ledger. This then creates a trust-free server solution, typically based on a blockchain. In this solution, the data that is processed by the bank (accounts and balances) is made public and secured by a certificate. Payment orders are recorded in a ledger and put into public domain. For privacy reasons, accounts may be anonymized. In order to verify a bill, one needs a full ledger in order to verify that e does in fact equal the sum of the values of all emitted bills. One problem with this solution is that the resources needed for verifying a bill do not scale.

Bitcoin-type solutions rely on a permissionless blockchain. In this solution, a bill is an entry in a ledger; bills are emitted according to ledger rules; the owner is defined by ledger rules (the owner id is decided by the payer, not assigned by the system); and the owner is changed according to ledger rules. The nominal values of bills range from 1 to e and the number of owners ranges from 1 to the number of bills. As in the previous case, verification of a bill requires the full ledger, and the verification process does not scale efficiently.

In all three of the solutions just summarized, in case of fixed e, not only the number but also the nominal value of bills in use varies. In part, because of this, the verification of neither the bills nor their ownership is scalable.

Hash Functions

Hashing of data is a well-known procedure and is used often in embodiments of this invention. In general, a cryptographic hash function h converts binary data X of arbitrary size to a bitstring (called the "hash value" or just "hash") $x=h(X)$ of fixed size, typically 256 or 512 bits. Cryptographic hash functions are assumed to be "collision resistant", which means it must be computationally infeasible to find a second, different binary input X' that has the same hash value as the first, X. The SHA class of hash functions is just one common choice that may be used in embodiments here, but no embodiment depends on this choice. Another advantage of hash functions is that they are in general efficient to compute: even standard hash functions like SHA-2 or SHA-3, for example, enable about a million hash operations per second on an ordinary desktop computer with only one processor core.

Blockchain

Although the term "blockchain" itself, as well as related terms, do not yet have universally accepted definitions, typically a "blockchain" is understood as being a data structure comprising a series of usually cryptographically linked and possibly time-stamped blocks, where each block includes data corresponding to one or more transactions, hashed together with linking data, such as the hash of some data and/or metadata of at least one preceding block. The blockchain can then be used to create a ledger, which is typically an append-only database.

Some blockchain variants involve distribution and consensus, that is, copies of the entire blockchain are distributed to several entities, which then follow a procedure to "agree" on what data is to be allowed to constitute the next block. Many of the blockchains used for cryptocurrencies follow this "permissionless" model, for example, since they, usually by design philosophy, wish to avoid any central authority. In other "permissioned" configurations, at least one controlling entity may control access to a proprietary blockchain according to its own rules; governments, banks, enterprises, etc., will, for example, usually not want the operation of their blockchains to depend on consensus among distributed, often anonymous outside entities. In either case, once data is entered into a block of the chain, the entry is essentially irrefutable, that is, non-repudiable, since any tampering with the data would be reflected in the chained hash calculations and thus easily detected.

Digital Signatures

Digital signatures are used in some steps of the embodiments described below. Embodiments of this invention do not require any specific form of signature service, and the system designer may choose any signature system that satisfies the security requirements of the particular implementation.

A particularly advantageous service and digital signature, however, is provided by the data signature infrastructure developed and marketed under the name "KSI®" by Guardtime AS of Tallinn, Estonia. This system is described in general in U.S. Pat. No. 8,719,576 (also Buldas, et al., "Document verification with distributed calendar infrastructure"). In summary, for each of a sequence of accumulation rounds, also known as calendar periods (typically related one-to-one with physical time units, such as one second), the Guardtime infrastructure takes digital input records as inputs, that is, lowest-level tree "leaves". These are then cryptographically hashed together, starting with a layer of gateway servers, in an iterative, preferably (but not necessarily) binary hash tree, ultimately yielding an uppermost root hash value (a "calendar value") that encodes information in all the input records. This uppermost hash value is then entered into a "calendar", which is structured as a form of a type of blockchain which, in some implementations, may involve further aggregating calendar values into a progressive hash tree. The KSI system then returns a signature in the form of a vector, including, among other data, the values of sibling nodes in the hash tree that enable recomputation of the respective calendar value if a purported copy of the corresponding original input record is in fact identical to the original input record.

Note that no KSI signature is returned to any input entity until all inputs have been received for a given calendar period. This is because, until all inputs are received, it is not possible to compute the root value. One consequence of this is that, once a signature has been returned for an input and a new calendar period has started, it is too late to get a "backdated" signature for the same (or any other). Moreover, even if one were to get more than one KSI signature for the same input data in the same calendar period, the signatures would be different.

As long as it is formatted according to specification, almost any set of data, including concatenations or other combinations of multiple input parameters, may be submitted as the digital input records, which do not even have to comprise the same parameters. One advantage of the KSI system is that each calendar block, and thus each signature generated in the respective calendar time period, has an irrefutable relationship to the time when the block was created. In other words, a KSI signature also acts as an irrefutable timestamp, since the signature itself encodes time to within the precision of the calendar period. Although the KSI infrastructure can thus function as a synchronization mechanism at the same time as providing digital signatures, it would also be possible to synchronize transaction commitments using any other chosen timing or time-stamping mechanism as long as some signature mechanism (including the KSI infrastructure) is also chosen to form the basis of the various proofs described below.

One other advantage of using a Guardtime infrastructure is that there is no requirement to store and maintain public/private (such as PKI) key pairs to generate a signature, although such keys may be used for the purposes of identifying users or as a temporary measure in some implementations in which calendar values are themselves combined in a hash tree structure for irrefutable publication. Another advantage is less apparent: Given the signature vector for a current, user-presented data record and knowledge of the hash function used in the hash tree, an entity will be able to verify (through hash computations as indicated by the signature vector) that a "candidate" record is correct even without having to access the signature/timestamping system at all: If exactly the same bit string is used as an input, then exactly the same calendar value should result from recomputation through the signature vector.

Yet another advantage of the Guardtime infrastructure is that the digital input records that are submitted to the infrastructure for signature/timestamping do not need to be the "raw" data; rather, the raw data, optionally combined with any other desired input information (such as user ID, system information, various metadata, etc.), may be hashed to form the input to the signature infrastructure. Given the nature of cryptographic hash functions, what gets input into the KSI system, and thus ultimately into the calendar blockchain, cannot be reconstructed from the hash, or from what is entered into the calendar blockchain.

Scalable Blockchains

An example of a trust-free solution is blockchain-based. One of the main concerns related to today's blockchain solutions is, however, their poor scalability. For convenience and to help understand the novel embodiments of this invention, the general theory of scalable blockchain solutions is outlined; fault- and attack-tolerant implementations of blockchains are also discussed.

General Description of Main Components

A general view of a the main components in embodiments is depicted in FIG. 1: A service infrastructure 10, which reference number also refers collectively below to the various processes it carries out, includes a central controlling entity 100, which communicates with a blockchain "machine" 200. Users (referenced collectively as 400), via any conventional device such as a smart phone, tablet, personal computer, terminal, etc., interact with the service infrastructure 10 via an application program interface 300, which communicates with an input component 500 and an output component 600. The input and output components 500, 600 also communicate with both the central controlling entity 100 and the blockchain machine 200. Although the components 100, 200, 500, and 600 are illustrated as being separate systems, which will be a common choice in practical implementations, in some cases it may be possible to implement two or more of these components on a common hardware and/or software platform. Conversely, as will be understood from the description below, some of the components depicted in FIG. 1 may comprise more than one computing platform—in embodiments, for example, "the" blockchain is sharded, different shards residing on and being processed by different computing platforms.

In FIG. 1, a signature system 700 is also shown as being part of the overall service 10, which is one option. The signature system 700 (for example, the KSI system) may instead be an external service that the components of the service 10 or any other entities may communicate with using other conventional methods in order to obtain digital signatures. Depending on the signature method chosen, as needed, these entities may also communicate with the signature system in other to verify signatures, which may be used in proofs of validity and integrity of various data structures and data described below.

Figure 2:
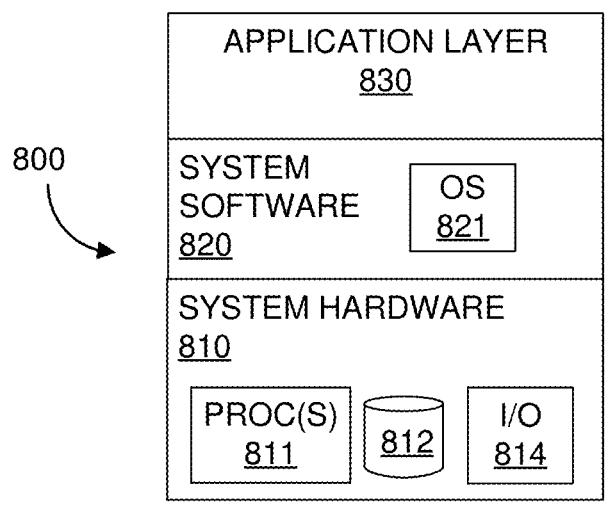
FIG. 2 illustrates the components of a typical hardware/software platform.

The routines, processes, storage functions, etc., described below must of course be performed by actual hardware and software platforms, even if any of these are done remotely, such as by using cloud computing, or in virtual machines, etc. FIG. 2 illustrates the main hardware and software components of one example of the type of computing system, that is, "platform" 800, that may be used to carry out the respective processes involved in embodiments of the invention.

Each platform will include standard components such as system hardware 810 with at least one processor 811, volatile and/or non-volatile memory and/or storage, indicated "collectively" as component 812, and standard I/O access components 814 to enable communication with other entities and systems over any known type of network, wireless or wired. The processor-executable code organized as software modules used to carry out the various computations, routines, and functions described below may be stored and thus embodied in either or both types of memory/storage components 812. The software modules will thus comprise processor-executable code that, when run by the processor(s) 811, cause the processor(s) to carry out the corresponding functions. Some form of system software 820 will also be included, such as an operating system 821 and/or virtual machine hypervisor.

Platforms will also include an application layer 830, which comprises various software components/modules for performing the functions described below. Although some entities may run on a single hardware/software platform, such as is shown in FIG. 1 for the central control entity 100, this is not a requirement; rather, some entities may operate using hardware and software resources that reside and run on more than one physical and/or virtual platform. As is explained below, this is particularly the case with the blockchain machine 200, which will typically (but not necessarily) comprise a different virtual and/or physical platform for each gateway that maintains a bill ledger and even "a" gateway may be comprised of a cluster of separate platforms.

The service 10, in particular, the blockchain machine 200, updates a blockchain data structure based on some additional input x. For example, as described below in the case of a digital cash implementation of embodiments of this invention, x contains emission orders and payment orders. A rule-based process may then be applied to compute a new version or state of the blockchain, based on the previous version and the additional input x. One such rule may be that, for a given data set (such as cash "bill"), only one change may be made during an update period, such as a period in which digital signatures are formed; in implementations that use the Guardtime KSI system for signatures, this period may be one calendar period or, more generally, the period during which inputs are aggregated to form a hash tree root value from which signatures are generated as hash chains. These concepts are described in more detail below.

The blockchain data structure used in embodiments does not need to depend on the central controlling component 100 having a trusted long-term memory of all transactions; rather, all necessary data for the service may be stored in the input and output components, with the blockchain mechanism itself being stored in the component 200 (which, as is described below, comprises shards).

Cryptographically Verifiable Data

All data in the blockchain should preferably be reliably verifiable without using any assumptions about the physical host machines. This may be achieved by using cryptographically verifiable data, that is, the blockchain itself and the additional input x may contain cryptographic certificates that protect their integrity. The verification of input and output data may thus depend on the service rules and cryptographic certificates.

Mathematically, the blockchain may be defined by two functions:

Verification function V that on input of a blockchain B, returns $V(B) \in [TRUE, FALSE]$.

Update function U that on input of a blockchain B' (current version) and an additional input x, returns a new blockchain $B=U(B', x)$.

Both V and U may depend on parameters, such as public and private cryptographic keys.

The system may set $U(B', x)=B'$, if x is invalid. In other words, if the input value x is in any way improper, then the blockchain is not changed according to x.

Figure 3:
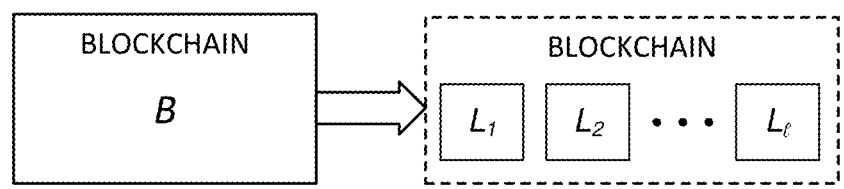
FIG. 3 illustrates decomposition of a blockchain into sub-ledgers.

System Scalability As mentioned above, a common problem with existing solutions is a lack of scalability: As the number of transfers ("transactions") increases, either the system cannot keep up in time, or the size of the ledger that many different entities must agree upon, update, and store becomes impractical. In embodiments of this invention, this problem is addressed in part by decomposing the ledger/blockchain that the blockchain machine 200 represents, that is, it implements a partitioning rule (see FIG. 3) such that the whole blockchain/ledger B is decomposed into 17 sub-ledgers $L_1, L_2, \ldots, L_l$ (referred to collectively as just L) so that transactions involving a bill may be processed in one particular part $L_i$ of the ledger, with no need to access and process the whole blockchain B. Mathematically, one may represent this decomposition as a function D, such that $D(B)=(L_1, L_2, \ldots, L_l)$ and a composition function C such that $C(L_1, L_2, \ldots, L_l)=B$, that is, $C(D(B))=B$ for any possible instance of the blockchain. In this case, one may use the notation:

$$B \cong (L_1, L_2, \ldots, L_l)$$

For full-fledged scalability of the system, both the verification of the ledger and the production of the ledger by the service 10 should be scalable.

Verification Scalability

In a blockchain with scalable verification, several instances of a verification process may be applied to different sub-ledgers L, so that for the verification of one sub-ledger no data from other sub-ledgers is needed. Mathematically, this means that the verification predicate V is a Boolean conjunction:

$$V(B)=V_1(L_1) \wedge V_2(L_2) \wedge \ldots \wedge V_l(L_l),$$

where $V_1$, $V_2$, and $V_l(L_l)$, are predicates.

Service Scalability

Figure 4:
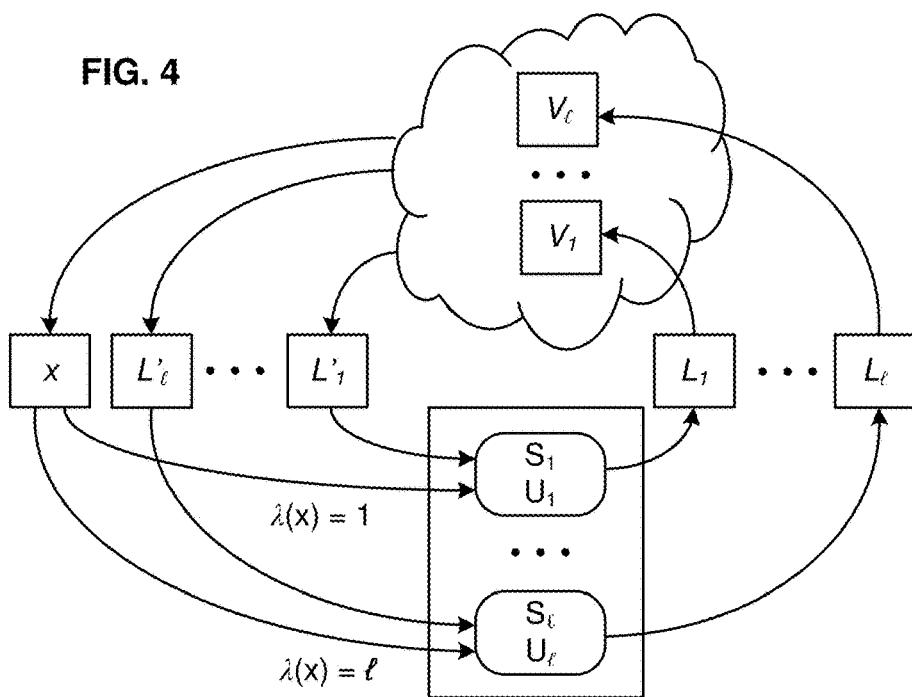
FIG. 4 illustrates a blockchain with a scalable service.

Every physical server has limited processing speed, memory and network connectivity. In order to make the production of the blockchain highly scalable, embodiments of this invention decompose the service process S into multiple processes. Not only does this reduce the workload of each process, but it also allows multiple changes to "the" blockchain to be processed in parallel. As depicted in FIG. 4, the service process may thus comprise several component servers and associated processsses $(S_1, \ldots, S_l)$ each of which produces and processes only a part of the blockchain (that is, a limited set of subledgers L) using as input only a part of the blockchain and only a subset of additional inputs x. Partial update procedures $U_1, U_2, \ldots, U_l$ are then applied such that if $B' \cong (L'_1, L'_2, \ldots, L'_l)$, then for every input x:

$$U(B', x) \cong (U_1(L'_1, x), \ldots, U_l(L'_l, x))$$

As mentioned above, in embodiments of this invention, the blockchain, which encodes the state of all emitted bills, is sharded, such that, instead of a single ledger, there are subledgers that, together, include the information for bills. Here, by "sharding" is meant a function $\lambda$ that for every additional input x, returns an index $\lambda(x) \in [1, \ldots, l]$ such that for every index $i=\lambda(x)$, $U(L'_i, x)=L_i$. In other words, every input x influences only one subledger $L_{i(x)}$, which is chosen depending on x.

In practice, this means that given an additional input x, before sending it to the service, the system computes $i \leftarrow \lambda(x)$, and sends x only to the component $S_i$ of the service, because other components would have no reaction to x anyway. The practical implication of this is explained below but can be summarized here: each given bill that has been emitted is associated with one of the ledger shards, that is, sub-ledgers, and the computing system (such as a server) that holds and processes that sub-ledger.

Such a decomposition, as in embodiments of this invention, can guarantee limited memory, processing, and communication requirements to the component servers, which, consequently, enables far superior scalability relative to prior art solutions that use a single, distribute global ledger.

Figure 5:
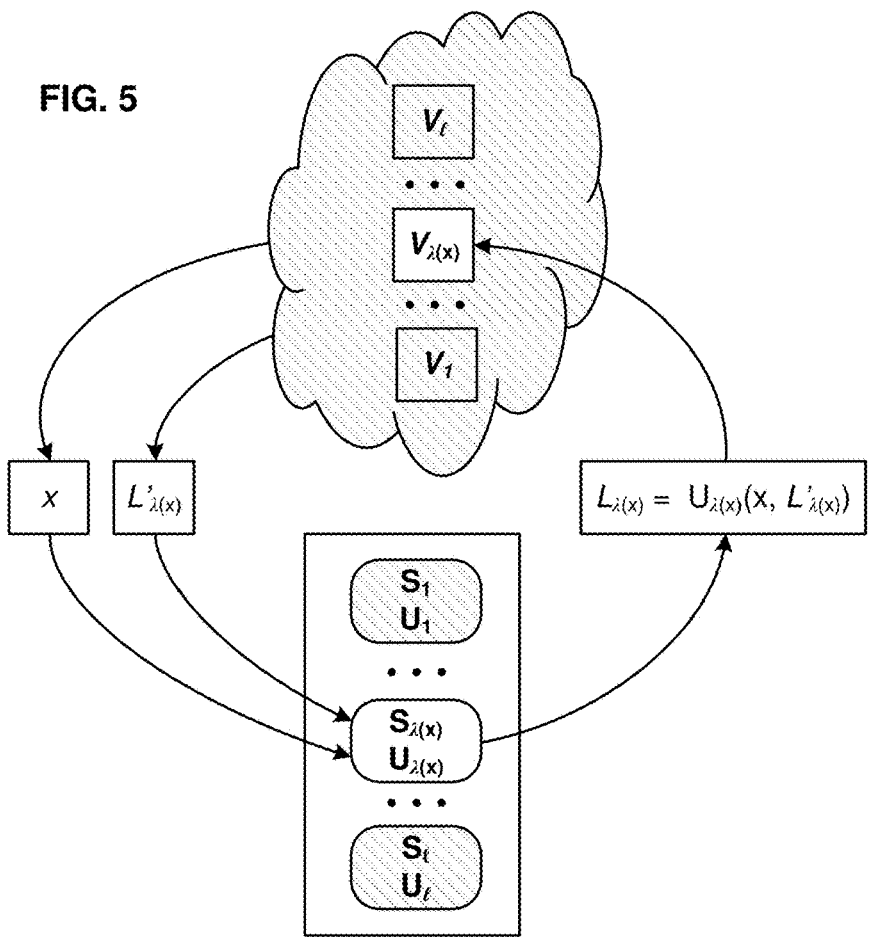
FIG. 5 illustrates request processing in a scalable blockchain system.

The general logic of data processing in a scalable blockchain system according to embodiments of this invention is depicted in FIG. 5. Given an additional input (request) x, the associated service component is found via applying the sharding function $\lambda$ to the additional input. The request is then processed by the service component $S_{\lambda(x)}$ by applying the update function $U_{\lambda(x)}$ to the additional input x and the subledger $L'_{\lambda(x)}$ and the new subledger is computed:

$$L_{\lambda(x)}=U_{\lambda(x)}(x, L'_{\lambda(x)})$$

The newly computed subledger can be verified by applying the component $V_{\lambda(x)}$ of the verification function.

Fault- and Attack-Tolerant Implementation of the Service

Figure 6:
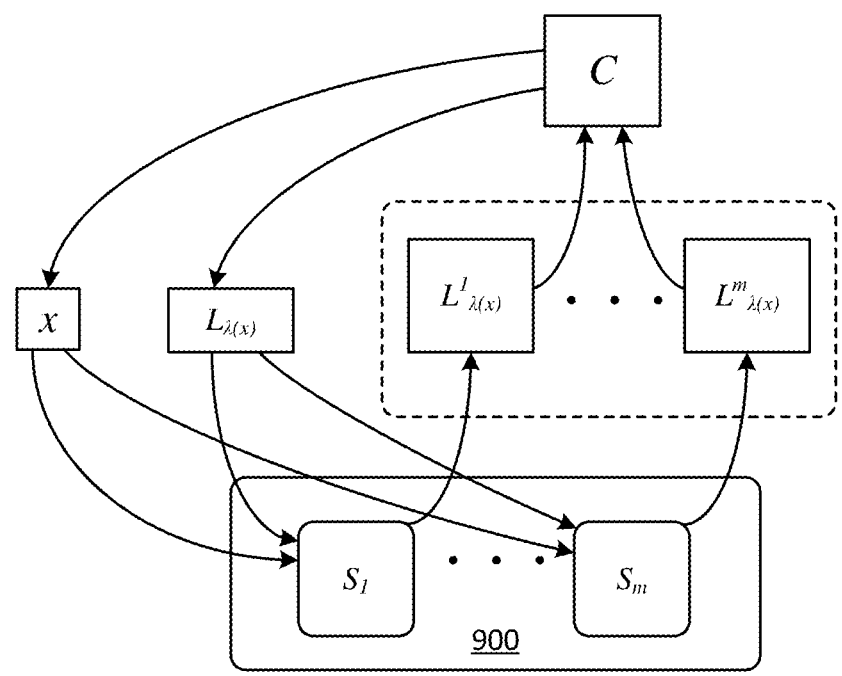
FIG. 6 illustrates a fault- and attack-tolerant implementation of a service.

To eliminate or reduce trust requirements of the service, the implementation of the service is preferably Byzantine fault tolerant; for example, it should guarantee that every correct and consistent transfer/payment order will eventually be processed by the service and ledger changed accordingly. To solve this problem, embodiments may implement a redundant design where the service is provided in parallel with a cluster (900, FIG. 6) of physical servers. These servers take as input x the payment orders and produce the same sub-ledger. In short, each ledger shard may be handled in parallel, redundantly, by a cluster of servers acting as "the" server responsible for bills assigned to the respective shard.

To achieve this, a multi-party communication protocol between those servers is provided for the detection and correction of Byzantine faults. A "Byzantine fault" of a physical server means here any form of misbehavior of this server, including all kinds of sneaky adversarial behavior; this is a known definition. Byzantine fault tolerance thus implies attack tolerance.

There are known multi-party protocols developed for achieving Byzantine fault tolerance for a limited set of Byzantine faults (limited number of faulty-nodes, etc.). These protocols are known to be very efficient for a relatively small numbers of physical servers. In the context of embodiments of this invention, the properties that the designer-chosen protocol should have include (see FIG. 6):

- The additional input x is sent to all physical servers $S_1, \ldots, S_m$ of the cluster. The servers may use a gossip mechanism (a known concept, involving inter-server communication) such that if x reaches at least one non-faulty server, it reaches all non-faulty servers.
- Every physical server has a copy of the corresponding component ledger $L'_{\lambda(x)}$
- All physical servers $S_1, \ldots, S_m$ independently compute and output, respectively, the variants of the next versions $L^1_{\lambda(x)}, \ldots, L^m_{\lambda(x)}$ of the ledger.
- Any entity that uses the output of the server cluster collects all or at least some architected minimum number of the outputs of the list $L^1_{\lambda(x)}, \ldots, L^m_{\lambda(x)}$ that are available.
- There is a consensus function C that, given as input the list $L^1_{\lambda(x)}, \ldots, L^m_{\lambda(x)}$ of next versions of the ledger, outputs the consensus value $L_{\lambda(x)} \leftarrow C(L^1_{\lambda(x)}, \ldots, L^m_{\lambda(x)})$ of the ledger, or an indication $\perp$ (no valid result) if there is no consensus. For example, the function C may be defined in a way that $L_{\lambda(x)}$ equals to the common value of a subset of $T > m/2$ physical servers, or $\perp$ if there does not exist a majority subset that have the same value. In short, the system determines if enough physical servers agree on what the new ledger should be.
- The implementation of the verification function V may allow some of the arguments to be missing but it is assumed that the verifier has at least the values of a sufficient number of non-faulty nodes.
- As a consequence, the non-faulty servers will agree on the same version of the ledger, assuming that sufficiently many of them are non-faulty.

The necessary number of redundant servers depends on the fault-tolerance requirements of the service. The system designer may choose any known Byzantine fault tolerant solution based on the particular requirements of an implementation of the system for particular states.

Note that, in systems such as Bitcoin, fault tolerance is achieved only with massive, generally thousand-fold redundancy, with Byzantine faults being corrected by using a proof-of-work concept. Such massive redundancy will be impractical in many cases such as where a central bank wishes to implement digital cash. Moreover, proof-of-work schemes typically introduce an uncertainty in the oversight and control of the system that will be unacceptable in many situations such as with central banks or governmental authorities.

KSI-Based Digital Transfer System

Embodiments implement a system that enables highly scalable and verifiable transfers of single-instance data sets that leverage the Guardtime KSI infrastructure summarized above. One illustrative embodiment is digital cash. This example has the advantage that it has certain features and requirements that are not present or may be relaxed in other scenarios. Transfer of cash, for example, involves the notion of "value" or "denomination that, for example, transfer of a highly classified document file might not", and often a desire for transaction anonymity. The invention is not limited to such applications, however.

Auditability and Scalability

Assume by way of example that the invention is to be implemented for a digital cash system such that a central authority or administrator, such as a central bank, wishes to be able to control the emission of currency units ("bills", for short), where the holder ("owner") of a bill is able to control transfers, that is "payments". In addition to the possible (but optional) desire to retain anonymity, other features will often be useful.

Preferably, even without using trusted services to perform transfers, an external party such as an auditor should, additionally, be able to audit both operations, thereby increasing the trustworthiness of the system.

Processes used in the system should be scalable—preferably, highly scalable —, highly fault tolerant, and highly secure (attack tolerant). In a digital cash scheme, for example, there will often be a need to be able to process possibly large numbers of transfers every second.

Blockchain-Based Embodiment

Figure 7:
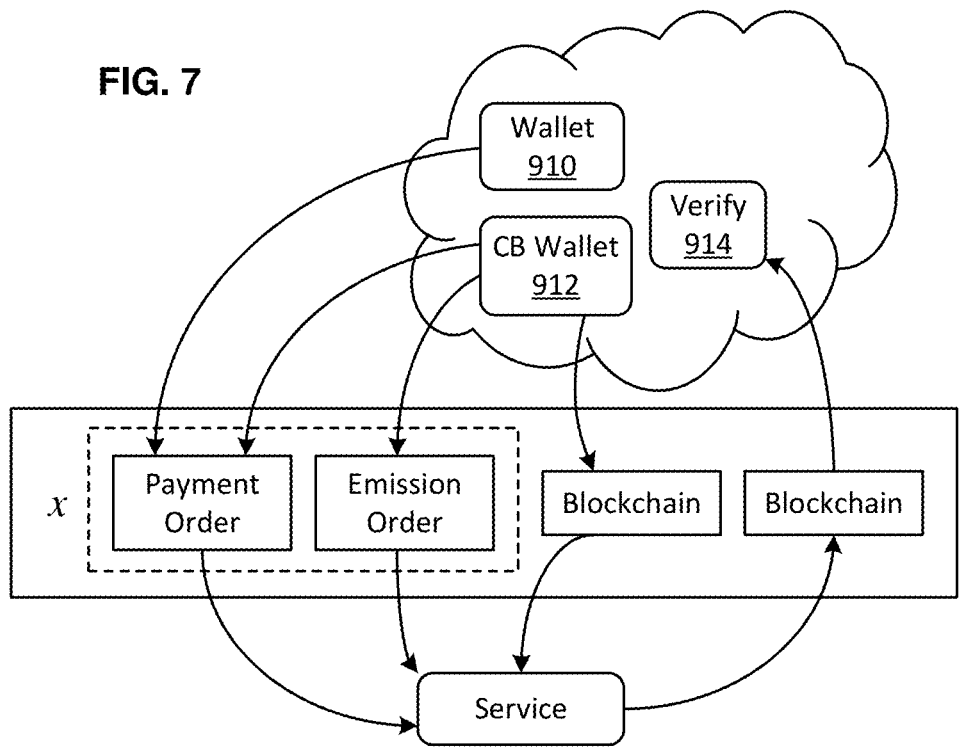
FIG. 7 illustrates a blockchain model for processing data sets such as digital cash.

See FIG. 7. The additional input x in a KSI-, blockchain-based embodiment includes two data structures 1) an Emission order structure and process that creates new bills (that is, data sets representing respective currency units); and 2) a Payment order structure that contains information indicating any changes of the owner of a bill.

Three component processes, which may be implemented in any computing system or group of computing systems, are: 1) a Wallet process 910, capable of creating payment orders; 2) a Central Bank Wallet (CB Wallet) process 912 capable of creating emission orders and the payment orders; and 3) a Verify process 914 that carries out a verification procedure for checking cryptographic certificates of the blockchain.

Users of the system are assumed to have respective instances of the Wallet process 910, and the Central Bank (or other central authority that issues whatever notion of "bills" is involved) is assumed to have an instance of the CB Wallet 912. The wallets contain cryptographic keys for generating the cryptographic certificates (signatures) of Emission and Payment orders. Wallets may be implemented using any know data structures and coding methods.

The Verify procedure may be implemented in any known, chosen manner. How a KSI signature is verified is described above. The implementations of Wallet and CB Wallet preferably themselves contain respective instances of the Verify procedure since this will allow them to verify signatures (at least, KSI signatures) without needing to query an external trusted system to do so, but such reliance may be an acceptable option in some implementations.

The system has three main processes: Creation, Transfer, and Verification. In the context of digital cash, these may be termed Emission, Payment, and Verification. In other words, the central authority (such as a central bank) creates unique data units (such as a bill); these data units are transferred from one entity to another (such as a payer to a payee); and the parties involved or a third-party auditor should preferably be able to verify that a transfer is valid and correct.

Emission

The Emission process changes the amount e of money in the system. New bills are thereby inserted into the system, the initial owner of which will typically be the central bank (or other initial owner/holder of the data units). Note that the central bank will in many cases provide the emission service itself, although this is not required. In some jurisdictions, for example, some commercial banks are authorized by the central authority to issue new bills. A unique identifier, such as a serial number, is associated with each bill. In implementations in which the data units being transferred represent such items as units of digital currency, checks, instances of stock certificates or other rights, other negotiable bearer instruments, etc., all of which are examples of other types of "bills", emitted bills will also have an associated nominal value. Emission may proceed from the central bank wallet 912, which sends an emission order to the service infrastructure, which then updates the blockchain to include newly emitted bills. This may be carried out by the input component 500 or in the central controlling system 100, depending on where the associated processing functions have been chosen to be carried out in particular implementations.

Payment

The Payment process changes the designation of the owner of a bill. It is therefore necessary to be able to identify both the payer/transferor and payee/transferee. In embodiment of this invention, "identify" does not necessarily imply knowledge of the actual identities of the parties involved, although this is an option. Rather, the identifiers used by the service for the parties in a transfer may maintain the parties' anonymity, such as using a party-generated public key. In other embodiments, however, anonymity may not be required, in which case any other chosen identifier may be used, such as a national ID number. In some implementations, the service may be provided not by a central governmental authority, but rather by a private entity that issues and controls other value units (whether or not convertible to legal tender of any kind) or types of data sets; in such cases, the controlling private entity may also assign user/owner identifiers, which may be associated or associatable with actual identity, or not.

Payment involves changing an owner identifier associated with that bill, that is, changing the ownership of a data unit from a transferor to a transferee. To carry out a payment order, the current owner's Wallet sends the payment order to the Service, which then updates the blockchain (in particular the sub-ledger(s) associated with the bill(s) involved) to indicate the designated payee as the new owner. Users 400, which will include both transferors and transferees of bills, may access the service via the API 300, which communicates transfer requests and completions to the components 500 or 600. Note that different users may, and typically will, have different instances of the API 300; only one instance is depicted in FIG. 1 for the sake of simplicity.

Verification

Figure 9:
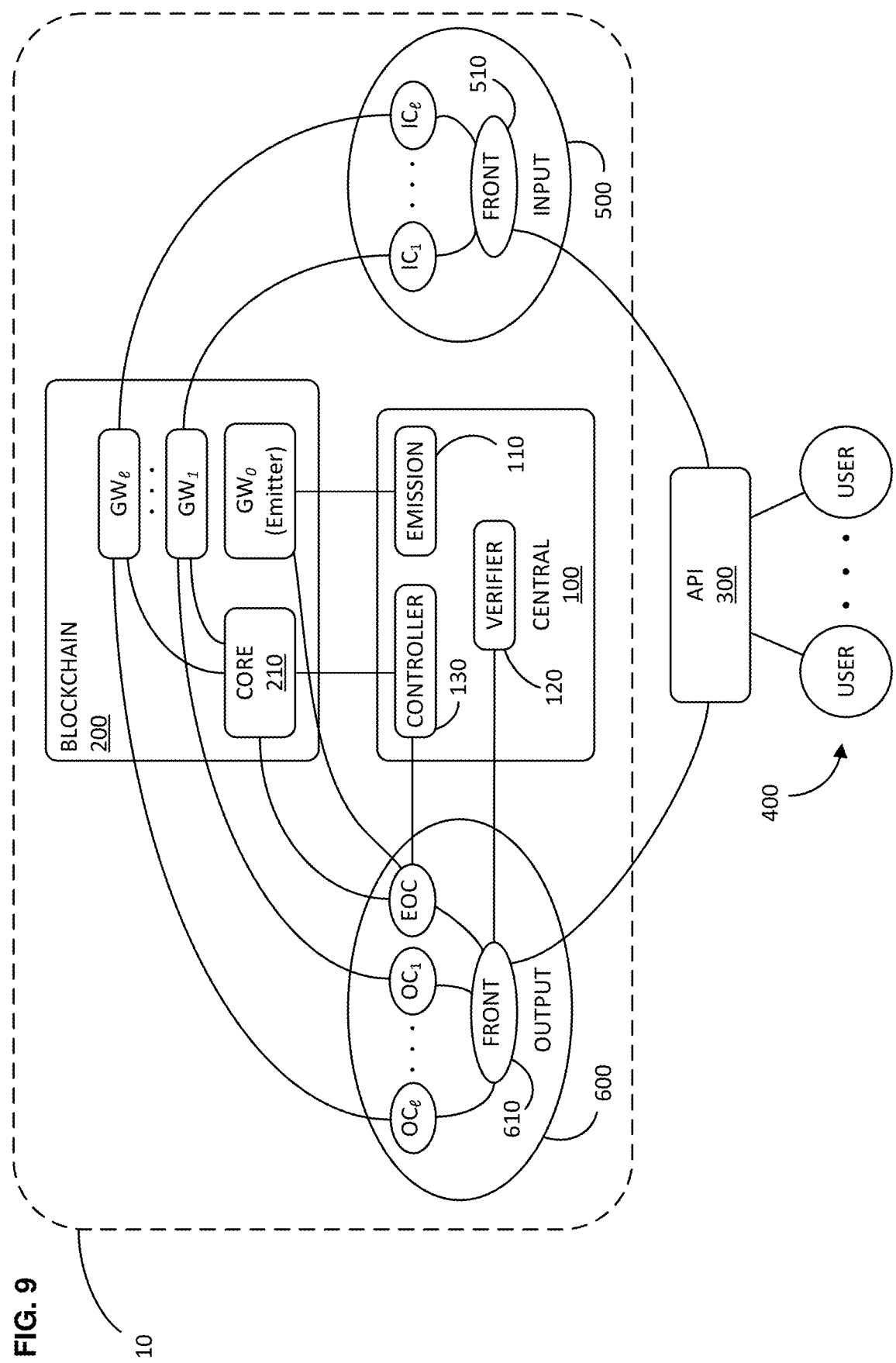
FIG. 9 illustrates information and control flow for transferring bills.

The information in payment orders, emission orders, and the different parts of the blockchain, may be made cryptographically verifiable, for example, by obtaining KSI signatures for each. The blockchain may provide the following verifiable proofs, which may be checked via the Verify process, which in turn may be carried out by a verification component located within whichever entity wishes to verify information. In FIG. 9, for example, a verification component 120 is illustrated, but similar components may be included in other entities as well, including (depending on which proof needs to be checked) in payer and payee systems as well, or in auditing systems (not shown):

Proof of Money (POM): a bill with a certain serial number and nominal value exists Proof of Emission (POE): a bill with certain serial number and nominal value has been emitted Proof of Ownership (POO): a bill belongs to a particular owner Proof of Transfer (POT): the owner of a bill has been changed from payer to payee Scalability One of the advantages of embodiments of this invention that they are highly scalable. This results from novel decomposition of both the verification process, and the Service process. See FIG. 8.

Decomposition of the Verification

The blockchain 1000 in embodiments here is decomposed into the following independently verifiable parts:

Emission ledger (EL), which defines which bills have been issued by the Central Bank.

List of l gateway ledgers $GL_1, GL_2, \ldots, GL_l$, (only one of which, $GL_i$ is shown to avoid cluttering the drawing), each $GL_i$ of which contains $k_i$ bill ledgers $BL_1^i, \ldots, BL_{k_i}^i$. Each bill ledger is a data structure that stores information associated with a respective emitted bill. Note that such a composition is possible due to the concept of atomic bills.

The total number k of bills in the system is thus $$k = \sum_{i=1}^{\ell} k_i.$$

To verify the status of one bill, a Wallet needs only the identity of that bill's bill ledger, and the Emission ledger EL (to verify that the bill was validly issued in the first place).

Decomposition of the Service

FIG. 9 depicts one example of some of the sub-components within the main components (shown in FIG. 1) of the Service 10.

Figure 8:
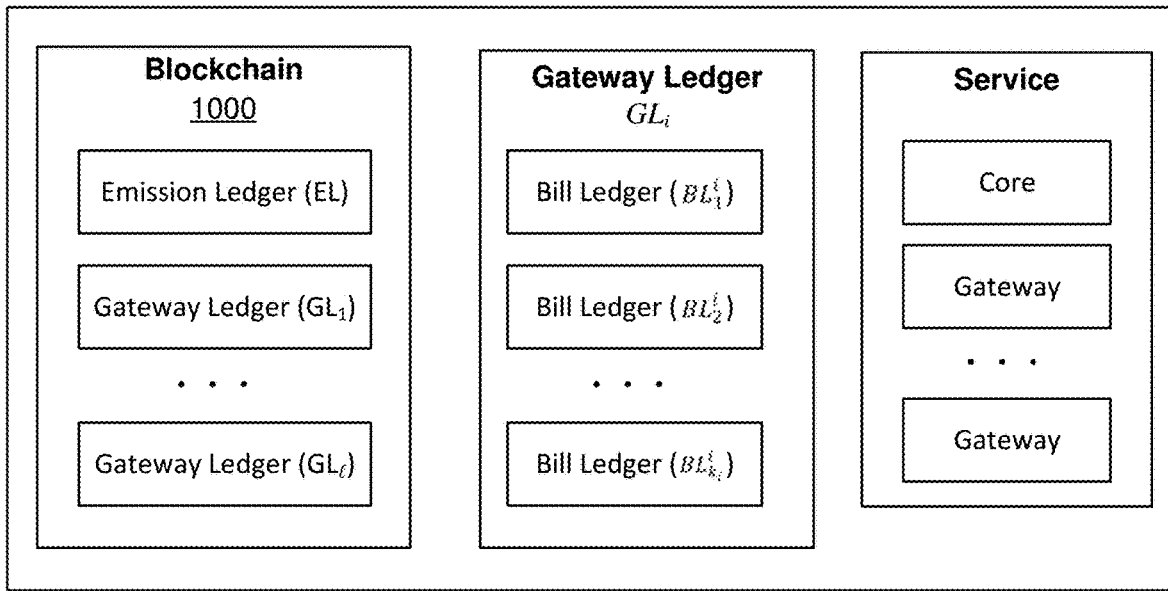
FIG. 8 illustrates decomposition of a blockchain by gateway ledgers and bill ledger.

The blockchain machine 200 may comprise:

A Core 210 within the blockchain machine 200, which updates the Emission ledger EL, FIG. 8) based on emission orders. The core also responds to blockchain queries, for example, from the central controller 130; and Gateways $GW_1, \ldots, GW_l$, as well as a gateway $GW_0$ assigned to the bill-emitting entity (such as a central bank), each of which updates a respective Gateway Ledger $GL_i$ (FIG. 8) based on payment orders, which change the owner of those bills whose ledgers are contained in the corresponding Gateway Ledger. A gateway could be a single server (physical or virtual) or other computing system, but may also be configured as a cluster of separate, gossiping, Byzantine-tolerant servers as described above.

The input component 500 will include a respective gateway front/interface component 510 that receives information such as payment orders, confirmations, etc., from user systems 400, and determines, based on the identifier of the bill, which of the l sub-ledgers tracks the bill. Gateway front input components/channels $IC_1, \ldots, IC_l$ receive payment orders from the respective front input component 510, as well as any input queries from the respective gateways. It then routes, for example, the payment order information for the bill to the correct, corresponding gateway $GW_1, \ldots, GW_l$, via the respective gateway front input components/channels $IC_1, \ldots, IC_l$.

To complete a transfer/transaction, the gateways $GW_1, \ldots, GW_l$ ill route transfer information via respective gateway output sub-components/channels $OC_1, \ldots, OC_l$, so that the front output component 610 may communicate with the recipient/payee user, for example, via the API 300. The front output component 610 is preferably also configured to perform such tasks as caching payment information, access control, filtering, and serve as a routing layer between the client API and gateway output component $OC_1, \ldots, OC_l$ instances.

Emission of new bills is, as mentioned, under the control of the central system 100, such as a server or server group under the control of a central bank. The central system 100 thus includes a controller 130 configured to communicate with the core 210 of the blockchain machine and with the emitter output component EOC. An emission component 110 is also provided, which communicates with a dedicated emitter gateway $GW_0$, which may then incorporate any newly emitted bills into the corresponding emission ledger EL (FIG. 8). In order to get new bills into circulation, that is, into the wallets of users, one example of which would be commercial banks, the emitter gateway $GW_0$ may communicate with the output component 600 via a dedicated emission output component EOC. The emitting entity, such as a central bank, may then act as a transferor of newly emitted bills, whereby transferees might be commercial or reserve banks, private entities, or any other "user" with an identifier in the system.

Wallets thus may access the Emission ledger and the bill ledgers of only those bills that the owner controls.

Sharding Function λ and the Configuration of the Service

In one embodiment, predetermined bits of the serial number (or of the identifier of whatever other data sets the system has been implemented for) of a bill determine in which gateway ledger, and thus gateway, its ledger is located. If, for example, there are l gateways in the system, and the m highest order (or other) bits of a bill's serial number are used to determine in which gateway the bill's ledger is maintained, an identifier of each gateway itself may be an m-bit number, where $m=\log_2 l$.

The sharding function (x) may, for example, be defined to be 0 if x is an Emission order, since this will not correspond to any particular gateway. If x is a Payment order, however, then (x) may return the m highest bits of the bill's serial number. The identifier i of the gateway that operates a payment order x (called the associated gateway) can be computed from the bill's serial number via the sharding function: i=(x). In short, a function is applied to the identifier of each bill to determine with which one of the gateways (and thus ledgers) it is to be "assigned" to. If the maximum number of bills is $k=2^n$, which have at least n-bit serial numbers then, on average, in an equally load-distributed configuration, every gateway will maintains $2^{n-m}$ bill ledgers.

Figure 10:
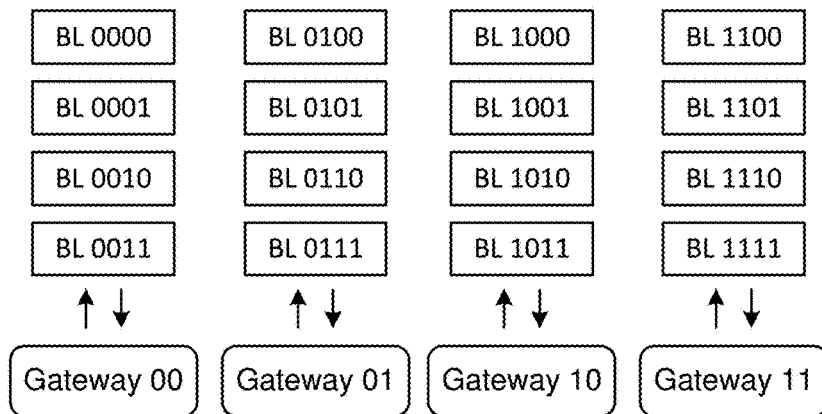
FIG. 10 shows one simple example of how bills are associated with gateways.

FIG. 10 depicts a sample, and simple, configuration with 16 bills in the system and four gateways, such that each gateway maintains the ledgers for four bills. The identifiers of the 16 bills in this example are thus 0000, 0001, ..., 1110, 1111, and the gateways are numbered 00, 01, 10, and 11.

Thus, in the illustrated case, l=4 and m=2. Assume that the identifier of a bill is 1001. Since the two most significant bits (MSB) are 10, any transactions relating to the bill will be directed to Gateway 10, which holds the bill ledger 1001 for the bill. Note that one advantage of this arrangement is that bill identifiers may be chosen to help balance the expected load on the different gateways.

Data Structures

Embodiments rely on several data structures and the processes by which they are established, changed, and maintained. These include different notions of "blockchain", data signatures, etc.

Blockchain

As used herein, a Block is a cryptographically verifiable data structure that consists of Data D and a Signature S:

A blockchain is an enumerated sequence $B_1, B_2, \ldots, B_n$ of blocks defined recursively:

Block $B_0=(D_0, S_0(D_0))$ is called the genesis block, where $S_0(D_0)$ is a signature of $D_0$ Block $B_n=(D_n, S_n(D_n, B_{n-1}))$ where $S_n(D_n, B_{n-1})$ is the signature of all or at least some defined sub-set of the data $D_n$ in the previous block $B_{n-1}$.

KSI Blockchain

The general features of the blockchain enabled by the Guardtime KSI system are described above. Some of its main characteristics can be summarized as follows:

Data D in a block is a sequence $(d_0, d_1, \ldots, d_k)$ of hash values, which typically have a fixed size. Some of the values $d_i$ may be missing.

Signature S is a KSI tree signature $KSITreeSig(d_0, d_1, \ldots, d_k)$ on D.

For every item $d_i \in D$ one can compute a KSI signature, in the form of a chain $c_i=KSISig(i, D)$ for $d_i$, which forms a cryptographic proof that dis the i-th component of D. In other words, if the value i is included as a parameter along with associated data in the input to the KSI signature system, the signature vector returned will enable recomputation through the KSI hash tree up to an irrefutable, known value, that is, the corresponding calendar value, but only if the correct value i is included as a parameter in the input submitted for verification.

KSI Signatures

U.S. Pat. No. 8,719,576, mentioned above, gives a more detailed explanation, but the use of KSI-generated signature is summarized here (again) for convenience and completeness. One feature of the KSI signature system is that it operates in time periods, which may be referred to as "calendar periods", "aggregation rounds", etc. For every calendar period t, the KSI system inputs values as "leaves" (lowest-level values), combines these in a hash tree, computes a current root value (the "calendar value") $r^t$ and then may return to each "leaf" entity the signature vector allowing recomputation of $r^t$ given the same leaf value as was input.

KSI Tree Signature KSITreeSig

Figure 11:
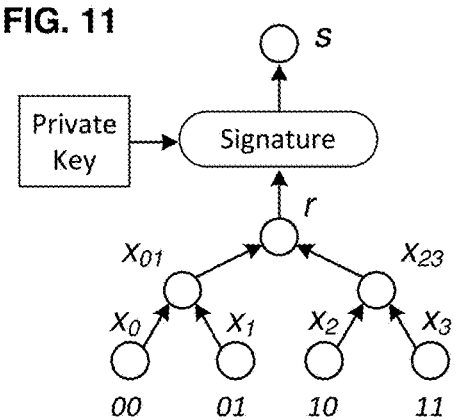
FIG. 11 is a greatly simplified illustration of one method for generating digital signatures.

More formally, a KSI tree signature $s \leftarrow KSITreeSig(x_0, x_1, \ldots, x_k)$ for a sequence $x_0, x_1, \ldots, x_k$ of hash values is computed via the following steps. FIG. 11 illustrates a KSI tree signature for k=3:

1) A Merkle hash tree with leaves $x_0, x_1, \ldots, x_k$ is computed

2) The root hash r of the tree is rendered irrefutable, that is, $s \leftarrow S(r)$ One way to render the value r irrefutable with respect to a particular entity is to sign it using any known public key signature algorithm (depicted as "Signature"); this may then tie the irrefutability to the holder of the public key. Another way would be to include the entity's private key as part of the lowest-level input, that is, as either a tree "leaf" itself or as a parameter included in the input set of some other leaf.

KSI Signature KSISig

If s is a KSI tree signature for a sequence $x_0, x_1, \ldots, x_k$, then for every $i=0, 1, \ldots, k$, the KSI signature KSISig($i$; $x_0, x_1, \ldots, x_k$) is a pair (s, $c_i$), where:

1) s is the KSI tree signature: s←KSITreeSig($x_0, x_1, \ldots, x_k$), that is the recomputation path through the KSI signature hash tree
2) $c_i$ is the hash chain of the i-th leaf of the KSI Merkle tree.

FIG. 11 illustrates a simple tree, with i=4 ("leaves" 00, 01, 10, and 11), having values $x_0, x_1, x_2$, and $x_3$, respectively. Then:

$c_0=(00; x_1, x_{23})$, $c_1=(01; x_0, x_{23})$, $c_2=(10; x_3, x_{01})$, $c_3=(11; x_2, x_{01})$

Thus, consider the hash chain for the second hash tree leaf from the left in FIG. 11, that is, the leaf at position $i=01_2$. The indicated value is $x_1$ (which may itself be a function, such as a hash function, of the "raw" input data). For this leaf, the chain is $c_1=(01; x_0, x_{23})$. To compute up the tree from $x_1$, $x_1$ is first hashed with $x_0$ to yield $x_{01}$. $x_{01}$ is then hashed with $x_{23}$ to yield r, assuming that the recomputation starts with the exact same $x_1$ as was used in creating $c_1$.

Note that the order of the signature elements may be chosen to be different than that shown, as long as the chosen order is known and maintained as a convention by the signature-generating entity, and all parties that need to verify data given its signature.

"KSI Cash" Blockchain

In the context of money, "cash" has the property that each unit ("bill") is uniquely identified, for example, by its serial number, has a set value (denomination), and has a requirement for well-controlled emission (no counterfeiting). These properties may also be found in other data sets that embodiments may be used to enable provably unique transfer of. For convenience, the unique-instance, and uniquely identifiable, data units are referred to here as "cash", or "KSI cash", since it is anticipated that it will be in the context of digital currency that embodiments of the invention will be most widely used. In the KSI blockchain used in the context of digital cash (or the like), the data part D of the block B=(D, S) of the overall blockchain for period t includes (in some embodiments):

Emission order E (optionally null, that is, E=∅)

A sequence of Payment orders $$P_1^t, P_2^t \ldots, P_k^t$$

length k, where k is the number of bills in circulation. Any $P_i^t$ can also optionally be "null", indicating that no payment order was generated at all for the given value(s) of t.

The signature part S may be a chained KSI tree signature ($c^t$, $x^t$), which may be defined recursively:

$$x^0 = (x_0^0, x_1^0, \ldots, x_k^0) = (h(E^0), h(P_1^0), \ldots, h(P_k^0))$$

$$c^0 = KSITreeSig(x_0^0, x_1^0, \ldots, x_k^0)$$

-continued $$x^t = h\big((x_0^{t-1}, E^t), h(x_1^{t-1}, P_1^t), \ldots, h(x_k^{t-1}, P_k^t)\big)$$

$$c^t = KSITreeSig\big(h(x^{t-1}, D_t)\big)$$

where h is a cryptographic hash function. Thus, for each payment order, a signature is generated, which encodes the signatures of previous payment orders.

In other embodiments, instead of including the entire past signature chain, only the immediately previous KSI signature may be included, since the KSI structure itself, in particular, the calendar, encodes all previous signatures are well, and also is synchronized with time, such that the previous signature will also be irrefutably time-stamped.

In many cases, there may be a large number of calendar periods in a row during which a bill is not transferred at all. Rather than actually iteratively hashing even the "null" PL values, an incrementing index nullinarow may be included instead. During verification, this index may indicate how many consecutive null values occurred, such that the verifier will know to hash the non-null P value just before the no-transfer periods nullinarow to get the non-null P value just after those periods end. In other words, the index can be used to reduce the number of hash computations needed up-front to only those relating to actual payment orders, with remaining hashing computations being done only as needed later for verification. Note that, if the KSI signature infrastructure is used, the index nullinarow itself may be derived from the time indications of the signatures of the non-null payment orders at either "end" of the null-periods, such that it would not be necessary to explicitly include nullinarow at all.

KSI Cash Ledger Decomposition

The KSI cash blockchain can be decomposed into:

Emission ledger E with blocks $$(E^0, c_0^0), (E^1, c_0^1), \ldots, (E^t, c_0^t),$$

where, for the genesis block $$c_0^j = KSISig(0; x_0^j, x_1^j, \ldots, x_k^j)$$

Bill ledgers $BL_1, BL_2, \ldots, BL_k$, where $BL_i$ has blocks $$(P_i^0, c_i^1), (P_i^1, c_i^1), \ldots, (P_i^t, c_i^1),$$

where $$c_i^j = KSISig(i; x_0^j, x_1^j, \ldots, x_k^j)$$

Figure 12:
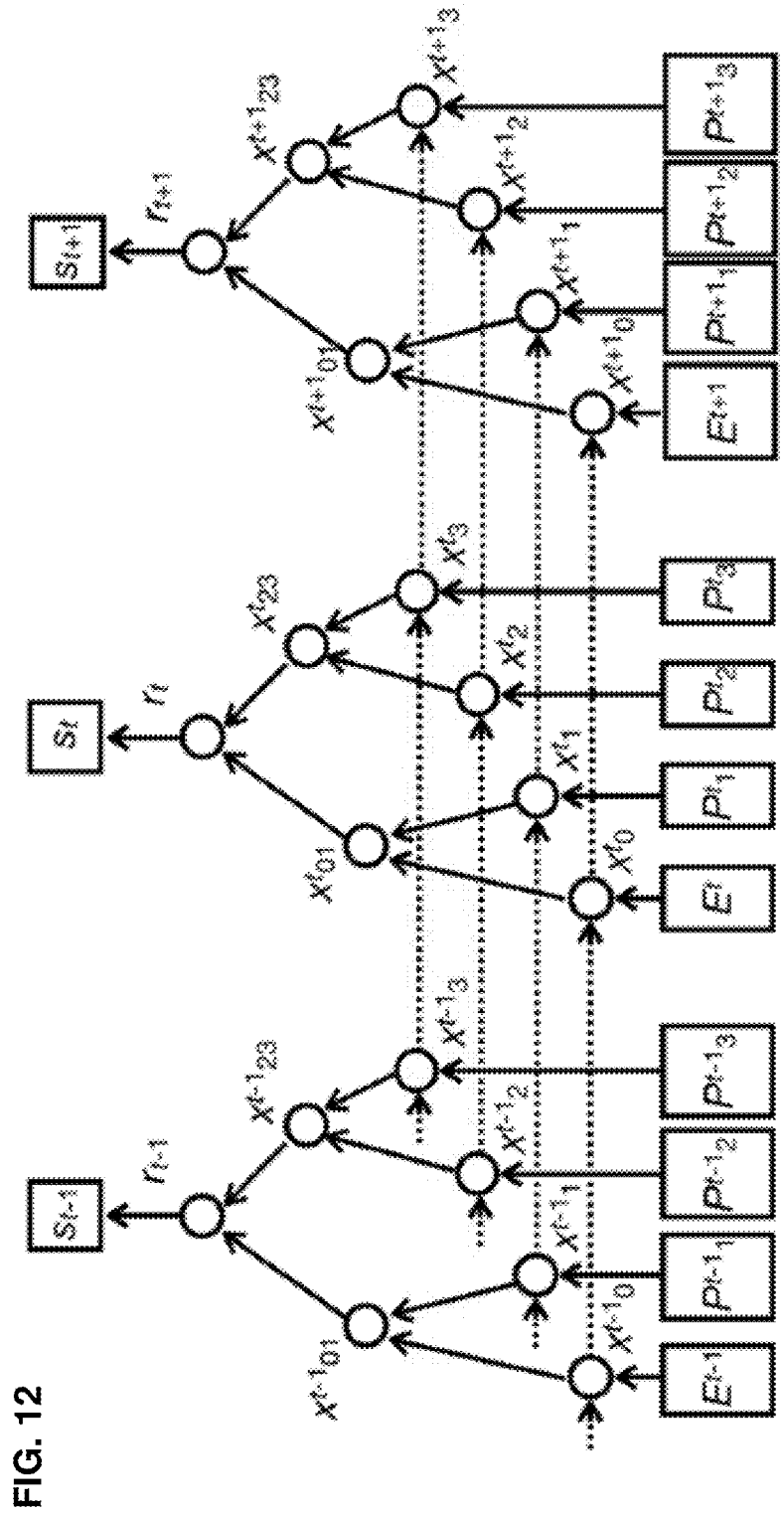
FIG. 12 illustrates one example of a ledger structure.
Figure 13:
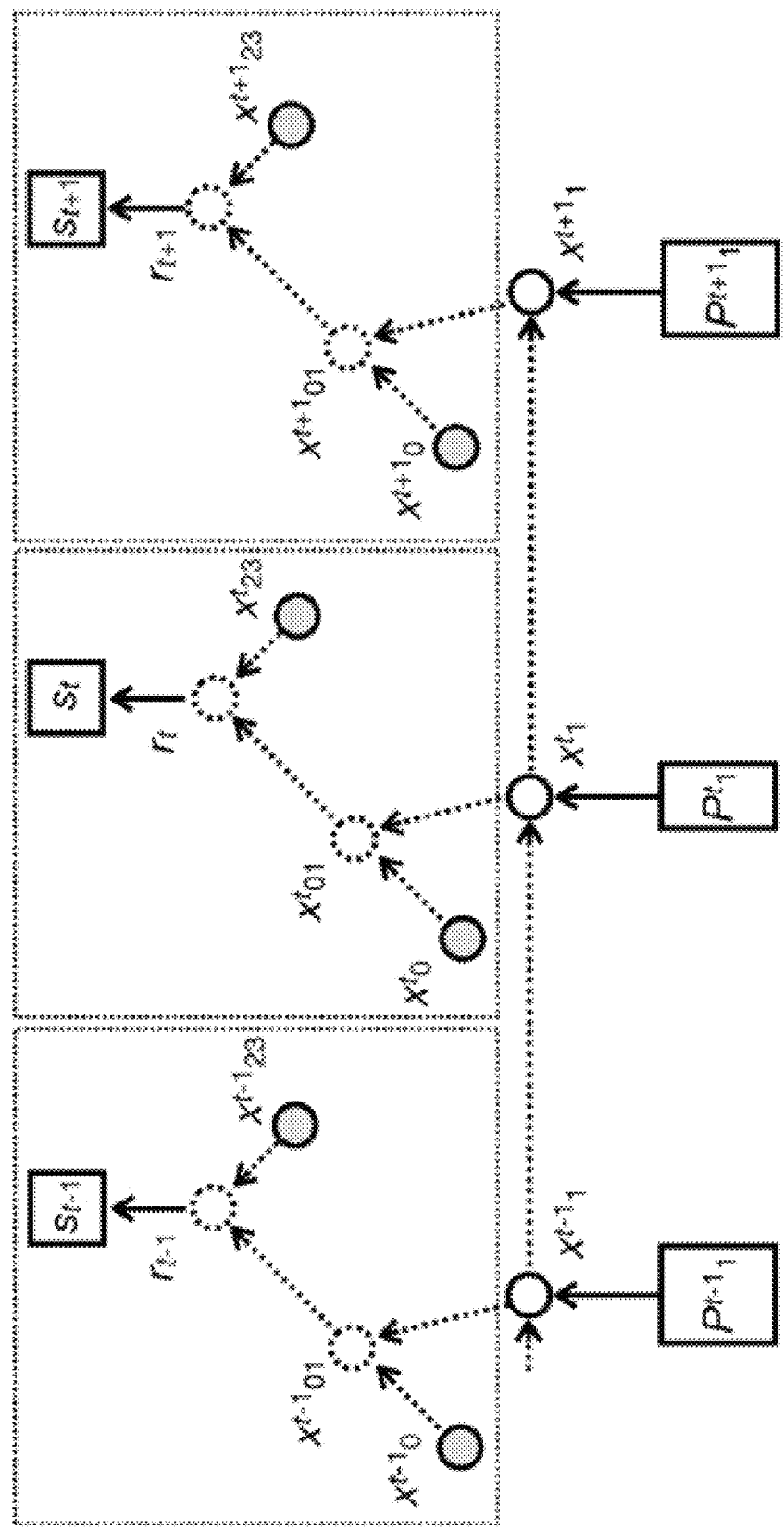
FIG. 13 depicts extraction of a subledger.

The structure of the KSI cash ledger is depicted in FIG. 12 and the way of extracting the subledger $BL_1$ is depicted in FIG. 13.

Emission Ledger

Figure 14:
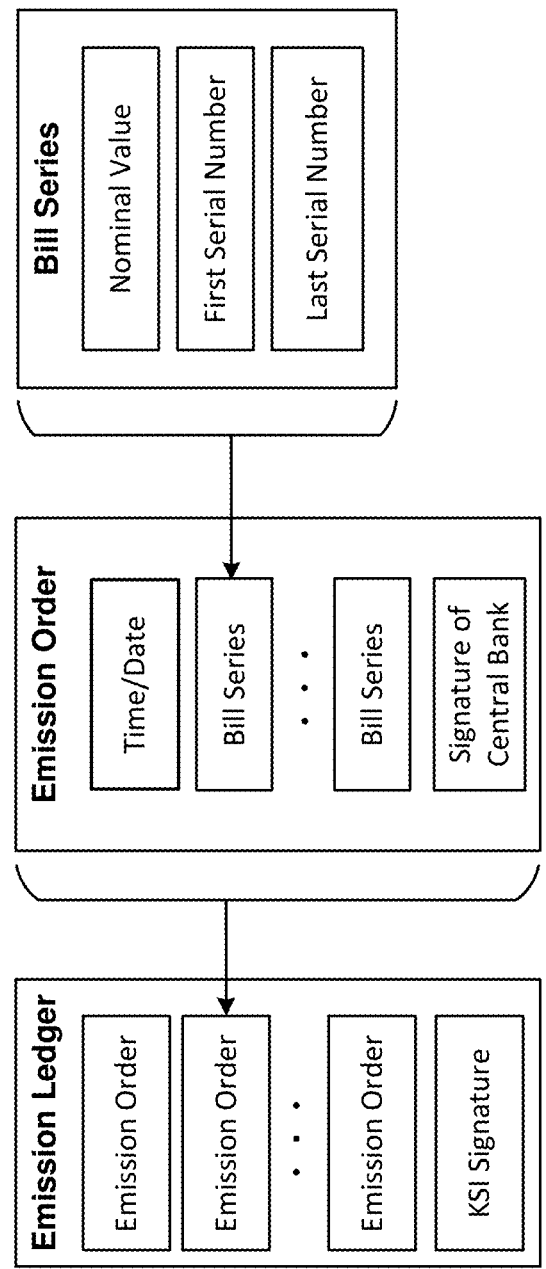
FIG. 14 illustrates an example of emission ledger data structures.

Various data structures provide proof that a bill was validly issued and is still validly in circulation. These include the Emission ledger itself, which includes or communicates with data structures relating to Emission order and Bill series. See FIG. 14.

Figure 15:
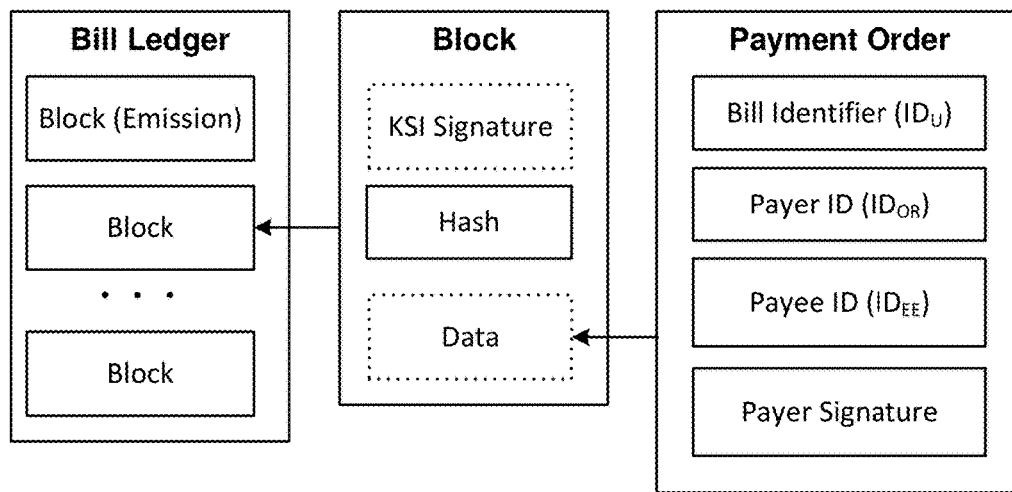
FIGS. 15-17 illustrates bill ledger data structures, with FIG. 16 illustrating a full bill ledger and FIG. 17 illustrating a reduced bill ledger.

Emission Ledger includes:
  List of Emission orders
  Proof of the state/contents of the emission ledger, which may be a KSI signature
Emission Order Preferably Includes:
  Time/Date of emission
  List of Bill series
  Proof of emission, which may be the signature of Central Bank
Bill Series Includes:
  Nominal value of the bill
  First serial number
  Last serial number (if a serial number never changes, this and the first serial number may be combined into one)
Bill Ledger
  A Bill ledger is created for each bill and forms a "sub-ledger", in that it tracks only a subset of the bills in circulation, namely, the bill to which is it assigned. The Bill ledger may be a list of blocks, the first of which may be called the Emission block. See FIG. 15.
Each Block Contains:
  Proof part, such as a KSI signature
  Block hash
  Data part
  The Block hash may be computed as the hash of a concatenation of the data part and the previous block hash. In case of the first block, it may be the hash of the data part.
  The Proof part may be either empty (null) or contain a KSI signature of the block hash.
  The Data part may be either empty or contain a Payment order with the following fields:
    Serial number of the bill
    Payer identifier
    Public key (of the payee)
    Signature (of the payer), which preferably verifies with the public key of the previous block with a non-null data part or, in the case of the emission block, with the public key of the Central Bank.

Figure 16:
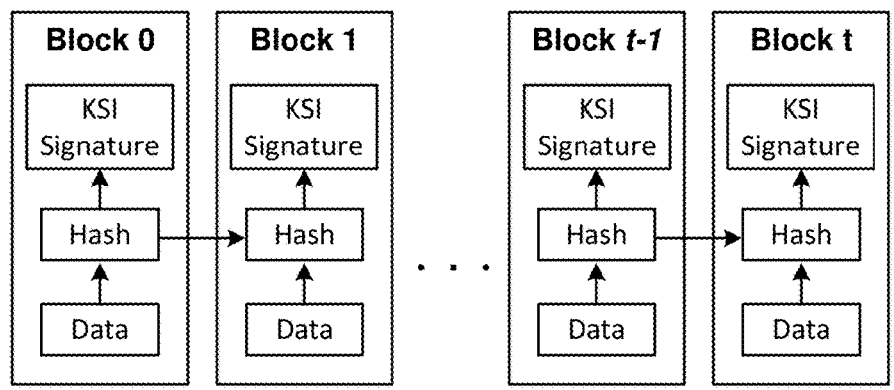
Figure 17:
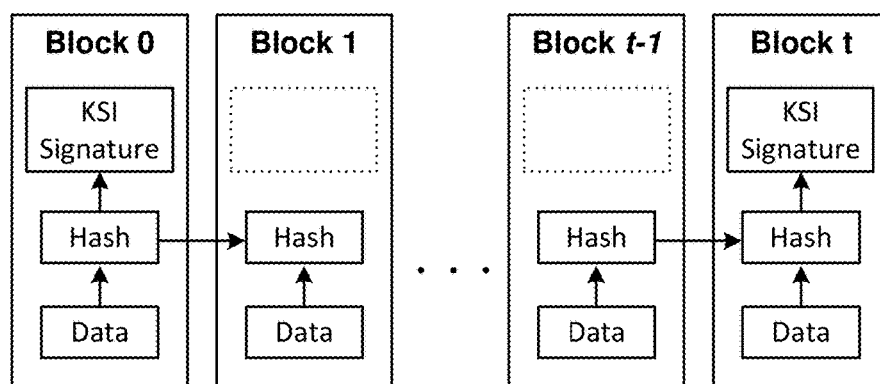

The Emission block will always have a non-null data part, since it represents the issuance of a valid bill. A bill ledger is full if all of its blocks have non-empty proofs (FIG. 16) and a bill ledger is reduced if only the emission block (Block 0) and the last block has a non-empty proof (FIG. 17). As before, and as described above, blocks corresponding to times at which no transfer occurred may be "compressed out" by using an index, or the time-synchronized nature of a KSI signature, or both.

Proofs

Embodiments of the invention provide several proofs that enable verification of the status of a bill and of a transfer, and thus allow for easy auditing of the system as a whole and its various functional parts. These proofs include Proof of Money (POM), Proof of Emission (POE), Proof of Ownership (POO), Proof of Transfer (POT). These proofs are preferably KSI signatures, that is, hash chains leading to an irrefutable root, which may be recomputed from a given "candidate" input—if, recomputing the KSI hash chain upwards with the sibling values in the signature, the same root value is reached as when the respective structure was signed, then the candidate input value must be the same as the original value for which the signature was generated. Any other known signature method may be used instead, however, depending on the level of security and auditability desired in each given implementation of the invention. Each proof has an Input, and Output, and Semantics, such as:

Proof of Money (POM)
  Input: Serial number of the bill
  Output: Correctly verifiable emission (first) block of the bill ledger with this serial number
  Semantics: The bill with the given serial number that has been "printed" by central bank. In the more general case, this is the data unit that has in some way been initiated by the central or originating system, with a unique identifier.

Proof of Emission (POE)
  Input: Serial number of the bill
  Output: Correctly verifiable Emission ledger which shows that a bill with the given serial number has been emitted.
  Semantics: The bill with the given serial number has been emitted (issued) by central bank Proof of Ownership (POO)
  Input: Serial number of the bill, unique identifier of the current owner, such as a the current owner's public key, time t
  Output: Correctly verifiable (reduced) bill ledger of the given serial number having t blocks in which the last block with non-empty data part contains the given public key (or other identifier) and the payee's public key (or other identifier)
  Semantics: The bill with the given serial number is owned by the given public key at time t Proof of Transfer (POT)
  Input: Serial number of the bill, Public key (of the new owner, that is, the payee), time t
  Output: Correctly verifiable (reduced) bill ledger of the given serial number with blocks $B_0, B_1, \ldots, B_t$ in which the data part of the last block of the ledger $B_0, B_1, B_2, \ldots, B_{t-1}$ has the payee's public key, the corresponding private key of which need not be controlled by the wallet.
  Semantics: The bill with the given serial number was not owned by any of the keys in wallet at time t−1

Together with the Proof of Ownership this means that the payee has been paid at t with the bill of the given serial number. The payee may request Proof of Transfer after, for example, being notified in any conventional manner of a transfer by either the payer or by the service itself.

Every digital bill in embodiments of this invention may thus be provided with a cryptographic proof that can be verified without relying on the trustworthiness of the operator of the service (for example, the central bank) or intermediaries. The correct operation of the system as a whole is also provable in real-time, which makes it secure against both inside and outside attacks on the integrity of the system and allows continuous mathematical verification of the total money supply, greatly reducing the cost of operations. In implementations in which KSI signatures are used as proofs, the only cryptographic primitive used in verification (of the money supply as a whole or individual bills) is a hash function (for example, SHA256 or SHA512), which means that the proofs are designed to withstand potential attacks by quantum computers.

Protocols

The main steps ("protocols") of Printing (creating new digital bills), Emission, Payment, and Bill Ledger Adjustment carried out by the different entities ("parties") in the system are summarized here.

Figure 18:
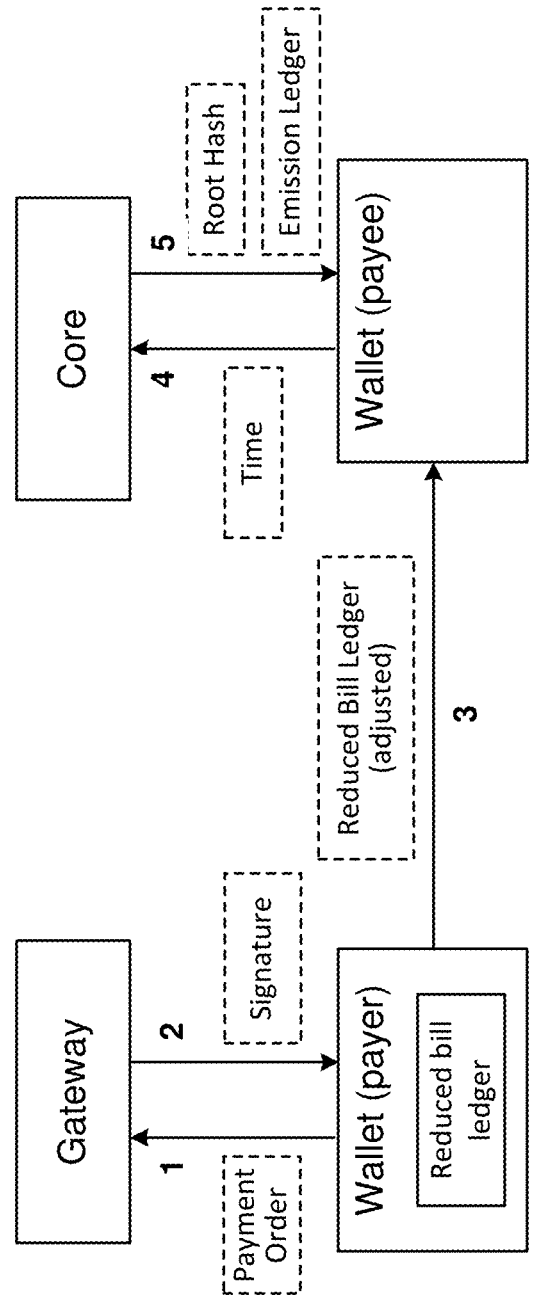
FIG. 18 illustrates messages during a transfer.
Figure 19:
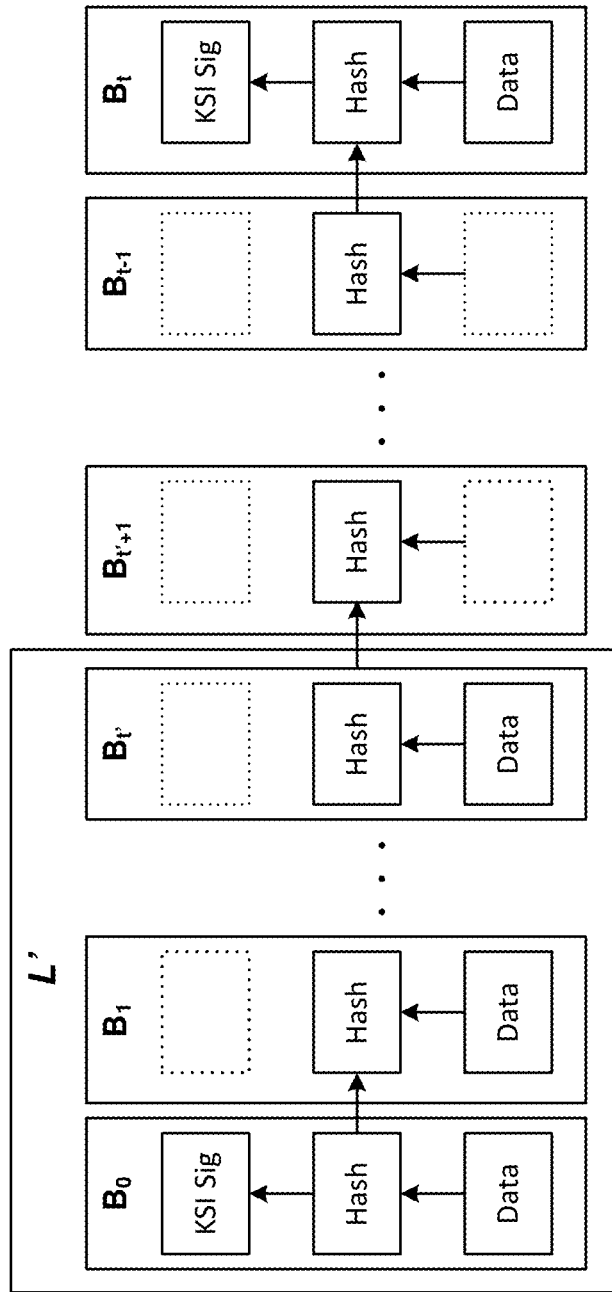
FIG. 19 illustrates adjustment of a reduced bill ledger.

Printing
  Parties: Central Bank, gateway
  Messages/steps:
    Central Bank creates and signs the emission blocks of a series of bills
    Central Bank sends the signed emission blocks to the respective associated gateways
    Dedicated gateway stores the emission blocks as the first blocks of new bill ledgers
Emission
  Parties: Central Bank, Core
  Messages/steps:
    Central Bank prepares and signs a new Emission order and sends it to the core
    The core adds the new record to the emission ledger
Payment
  Parties: Payer's wallet, Payee's wallet, Gateway, Core
  Messages/steps (FIG. 18):
    1) Payer wallet (a data structure and process within the corresponding user's computing system) signs a payment order and sends it to the associated gateway
    2) Gateway replies to the payer wallet with a KSI (or other) signature, which it may obtain by submitting a corresponding request for signature to whatever system implements the KSI infrastructure (if the KSI system is used for signatures), such as system 700 (FIG. 1)
    3) Gateway combines the payment order and the KSI signature to a block $B_t$
    4) Gateway adjusts the reduced bill ledger as described below. Note that, at this point, from the perspective of the gateway, the transfer will already have occurred—the payee is now the new "registered" owner of the bill in the bill ledger—and what remains is to inform the payee of this fact such that the payee can verify it
    5) Gateway sends the adjusted bill ledger to payee wallet
    6) Payee wallet requests the corresponding root hash and the Emission ledger from the core, thereby verifying not only that the payment order was correctly processed by the gateway, but also that the bill involved in the payment is valid
    7) Payee wallet verifies the proof of transfer based on the received Bill ledger and the information from the core
Bill Ledger Adjustment Procedure (FIG. 19)
  Let L' be the reduced bill ledger in Payer's wallet with blocks $B_0, B_1, \ldots, B_{t'}$; let $B_t$ be the new block of the bill ledger created by combining the payment order and the KSI signature obtained from the gateway that controls the respective bill; and let $t>t'$ be the time value in KSI signature.
  The adjustment procedure involves the following steps:
    1) Wallet creates $t-t'-1$ empty blocks $B_{t'+1}, \ldots, B_{t-1}$ and adds them to L'
    2) Wallet adds $B_t$ to L'
The adjusted ledger is depicted in FIG. 19.
Wallet Query
  Users may wish or need to know what bills they control, that is, what bills are in their respective Wallets. This may be accomplished, via the API, by issuing a query to the output component 600. The query should then include both the owner's identifier, and the owner's signature, such as public key. The output component may then return a list of the bills associated with that public key. It would also be possible to specify time ranges for the list to be retrieved, or to request, for example, the list of only the n most recent changes in the user's wallet; this would also enable confirmation of a most recent transfer.

Prevention of Double Spending

A major concern in all systems that involve transfer of a single valid instance of a data set is "double spending". In other words, a recipient (such as a payee) should be able to know that the sender (such as a payer) did not also transfer the same data set to some other recipient as well. In the context of digital cash, for example, a payee needs to be sure that the payer did not also give the same bill to another payee.

Embodiments of this invention have several mechanisms that can not only allow detection of double spending, but can prevent it from happening at all. According to one feature, a ledger rule is implemented such that no more than one KSI signature may be requested per bill per calendar period. Alternatively, the ledger for each bill may be configured so as to accept no more than one request for update per settlement period, which may be the same as a KSI calendar period, or may be synchronized (to set a "cut-off") to any other time system.

Since transfers "settle" at the end of a calendar or other synchronization period, the only way a payer could attempt to double-spend a bill would be to request yet another signature in another calendar period. By that time, however, the earlier, valid transfer will already have been either completed by the gateway, or has enqueued it for transfer, in that the earlier signature will already have been entered into the bill ledger, along with the key of the new owner—by the time the payer attempts to double-transfer the bill, he will no longer be the owner and thus will be unable to do so. In practice, this means that, once a payer has issued a valid payment order and this has been acknowledged by the service, the payer no longer "owns" the bill and thus cannot spend it again.

The invention claimed is:

1. A method for transferring exclusive ownership of data units comprising:
   assigning to each data unit a respective unique identifier;
   in a service infrastructure that includes a plurality of component servers:
     inputting a request from a transferor to transfer to a transferee at least a designated one of the data units, said request including an identifier of the transferor, the identifier of the designated data unit, and an identifier of the transferee;
     verifying the identifier of the transferor;
     confirming the absence of any other request to transfer the designated data unit during an update period;
     in a ledger, upon receipt of the request to transfer, and after verifying the identity of the transferor and confirming the absence of any other request, changing a designation of ownership of the designated data unit from the transferor to the transferee, such that no further request by the transferor to transfer the designated one of the data units can affect the ownership of the designated one of the data units;
   said ledger being configured as a plurality of subledgers, each subledger being maintained and processed in a respective one of the component servers and comprising a ledger data structure having elements indicating the ownership of each of a respective subset of the of the data units, and each data unit being associated with a respective one of the subledgers as a function of its unique identifier, said inputting and processing of the request to transfer the designated data unit requiring communication from the transferor solely to the service infrastructure.

2. The method of claim 1, in which each subledger is structured as a blockchain.

3. The method of claim 2, in which:
each subledger includes a bill ledger for each data unit associated with it;
for each transfer request received for a respective data unit, including selected data representing the transfer request in a respective digitally signed bill block, each bill block also including a cryptographic link from a previously created block;
each bill block is included in the corresponding bill ledger, along with an emission block including cryptographic proof of the emission of the data unit.

4. The method of claim 3, further comprising each subledger obtaining at most one digital signature per-data unit per-update period.

5. The method of claim 4, further comprising each subledger returning to the transferor proof of acceptance of the request and including in the digitally signed bill block a unique identifier of the transferee.

6. The method of claim 1, further comprising performing the steps of claim 1 per-subledger, whereby transfer requests for data units associated with different subledgers are processed in parallel.

7. The method of claim 1, further comprising:
inputting each transfer request to a plurality of processing systems, each of said processing systems forming a cooperating one of the component servers, each processing system having a respective copy of the respective subledger and separately performing the step of confirming the absence of any other request to transfer the designated data unit during the update period;
determining a Byzantine Fault Tolerant consensus state of the subledger at the end of the update period as a function of states of the copies of the subledger; and
updating the ledger according to the consensus state.

8. The method of claim 1, further comprising entering into an emitter subledger identifiers of newly emitted data units.

9. The method of claim 1, in which each data unit corresponds to a monetary unit having a nominal value.

10. The method of claim 9, further comprising generating a cryptographic proof of at least one state by obtaining a digital signature for a state input by submitting a representation of the state input to a hash tree infrastructure, in which the digital signature comprises a vector of sibling values enabling recomputation upward through the hash tree infrastructure to a root value that represents an uppermost value of the hash tree infrastructure having a plurality of tree input values submitted during an accumulation period at a corresponding calendar time, said root value being included in the digital signature;
whereby a later purportedly authentic representation of the state input may be verified as being valid if, upon recomputing a hash tree path represented by the sibling values, from the purportedly authentic representation of the state input through the hash tree, the same root value is obtained as is contained in the digital signature.

11. The method of claim 10, in which the state is the emission of the monetary unit and the state input is the identifier of the monetary unit.

12. The method of claim 10, in which the state is ownership of the monetary unit, and the state input includes the identifier of the monetary unit and the identifier of the transferor.

13. The method of claim 10, in which the state is the transfer of the monetary unit from the transferor to the transferee, and the state input is the identifier of the monetary unit and the identifier of the most recent transferee.

14. The method of claim 13, further comprising sending a wallet of the transferee a reduced bill ledger containing transfer data corresponding to the transfer of the monetary unit, including at least the root value corresponding to the transfer of the monetary unit.

15. The method of claim 10, in which the update period is the accumulation period of the hash tree infrastructure at the time of changing ownership.

16. The method of claim 1, further comprising each subledger accepting at most one request for transfer of any of the data units associated with it per update period.

* * * * *